(12) United States Patent
Toyoda

(10) Patent No.: US 10,784,713 B2
(45) Date of Patent: Sep. 22, 2020

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 31 days.

(21) Appl. No.: 16/344,216

(22) PCT Filed: Nov. 11, 2016

(86) PCT No.: PCT/JP2016/083496
§ 371 (c)(1),
(2) Date: Apr. 23, 2019

(87) PCT Pub. No.: WO2018/087876
PCT Pub. Date: May 17, 2018

(65) Prior Publication Data
US 2019/0334376 A1 Oct. 31, 2019

(51) Int. Cl.
*H02J 9/06* (2006.01)
*H02P 27/06* (2006.01)
(52) U.S. Cl.
CPC ............. *H02J 9/061* (2013.01); *H02P 27/06* (2013.01)
(58) Field of Classification Search
CPC ............. H02J 9/06; H02J 9/061; H02P 27/06
See application file for complete search history.

(56) References Cited

U.S. PATENT DOCUMENTS

2014/0021888 A1    1/2014  Niwa et al.

FOREIGN PATENT DOCUMENTS

| JP | 2-303326 A   | 12/1990 |
| JP | 4-372538 A   | 12/1992 |
| JP | 5-64378 A    | 3/1993  |
| JP | 2005-124249 A| 5/2005  |
| JP | 2010-124549 A| 6/2010  |
| JP | 2012-120407 A| 6/2012  |
| JP | 2014-23241 A | 2/2014  |
| JP | 2015-296396 A| 2/2015  |

OTHER PUBLICATIONS

International Search Report dated Jan. 24, 2017 in PCT/JP2016/083496 filed on Nov. 11, 2016.

*Primary Examiner* — Robert L Deberadinis
(74) *Attorney, Agent, or Firm* — Oblon, McClelland, Maier & Neustadt, L.L.P.

(57) ABSTRACT

During power running operation of a load, a control unit turns off a switch unit to supply AC power from an uninterruptible power supply unit to the load. During regenerative operation of the load, in a case where an AC power supply can recover regenerative power, the control unit turns off the switch unit to supply the regenerative power to the AC power supply via the uninterruptible power supply unit. In contrast, in a case where the AC power supply cannot recover the regenerative power, the control unit turns on the switch unit to cause an auxiliary load unit to consume the regenerative power.

7 Claims, 12 Drawing Sheets

UNINTERRUPTIBLE POWER SUPPLY DEVICE

TECHNICAL FIELD

The present invention relates to an uninterruptible power supply device.

BACKGROUND ART

Generally, an uninterruptible power supply device is configured to include a converter for converting alternating current (AC) power into direct current (DC) power, and an inverter for converting DC power into AC power, as described for example in Japanese Patent Laying-Open No. 2012-120407 (PTL 1). A power storage device is connected to this uninterruptible power supply device, and DC power is supplied to the uninterruptible power supply device by the power storage device.

In the uninterruptible power supply device described above, AC power from an AC power supply is converted into DC power in the converter. The DC power generated by the converter is supplied to the inverter and the power storage device. The inverter converts the DC power from the converter or the power storage device into AC power having a fixed frequency and a fixed voltage, and supplies the AC power to a load.

Further, when the AC power is not normally supplied from the AC power supply, the DC power is supplied from the power storage device to the inverter. Thereby, when an abnormality occurs in the AC power supply, the uninterruptible power supply device supplies the AC power to the load in an uninterruptible manner, for a period during which the DC power is stored in the power storage device.

CITATION LIST

Patent Literature

PTL 1: Japanese Patent Laying-Open No. 2012-120407

SUMMARY OF INVENTION

Technical Problem

In the uninterruptible power supply device described above, when regenerative power is generated in the load and the regenerative power is converted into DC power by the inverter, a DC voltage between the converter and the inverter is increased. Since the converter controls the DC voltage (between the converter and the inverter) within the uninterruptible power supply device to have a fixed value, DC power corresponding to a voltage exceeding the fixed value is converted into AC power by the converter, and is supplied to the AC power supply. In this manner, the regenerative power generated in the load is returned to the AC power supply.

However, when an abnormality occurs in the AC power supply, the AC power supply cannot recover the regenerative power, and thus the DC voltage within the uninterruptible power supply device is increased by the regenerative power. Thereby, a DC circuit (such as a DC link) connected between the converter and the inverter is overcharged, and thus the converter and the inverter may be stopped for overvoltage protection.

The present invention has been made to solve the aforementioned problem, and an object thereof is to provide an uninterruptible power supply device capable of suppressing regenerative power generated in a load from returning to an AC power supply when the AC power supply cannot recover the regenerative power.

Solution to Problem

According to one aspect of the present invention, an uninterruptible power supply device is configured to supply AC power supplied from an AC power supply to a load which alternately performs power running operation and regenerative operation. The uninterruptible power supply device includes an uninterruptible power supply unit, an auxiliary load unit configured to consume regenerative power generated in the load, a switch unit, and a control unit. The uninterruptible power supply unit is connected between the AC power supply and the load. The auxiliary load unit is connected to an AC bus which connects the uninterruptible power supply unit and the load. The switch unit is connected between the AC bus and the auxiliary load unit. The control unit is configured to control the uninterruptible power supply unit and the switch unit. During the power running operation of the load, the control unit turns off the switch unit to supply the AC power from the uninterruptible power supply unit to the load. During the regenerative operation of the load, in a first case where the AC power supply can recover the regenerative power, the control unit turns off the switch unit to supply the regenerative power to the AC power supply via the uninterruptible power supply unit. In contrast, in a second case where the AC power supply cannot recover the regenerative power, the control unit turns on the switch unit to supply the regenerative power to the auxiliary load unit.

Advantageous Effects of Invention

According to the present invention, there can be provided an uninterruptible power supply device capable of suppressing regenerative power generated in a load from returning to an AC power supply when the AC power supply cannot recover the regenerative power.

DESCRIPTION OF EMBODIMENTS

Figure 1:
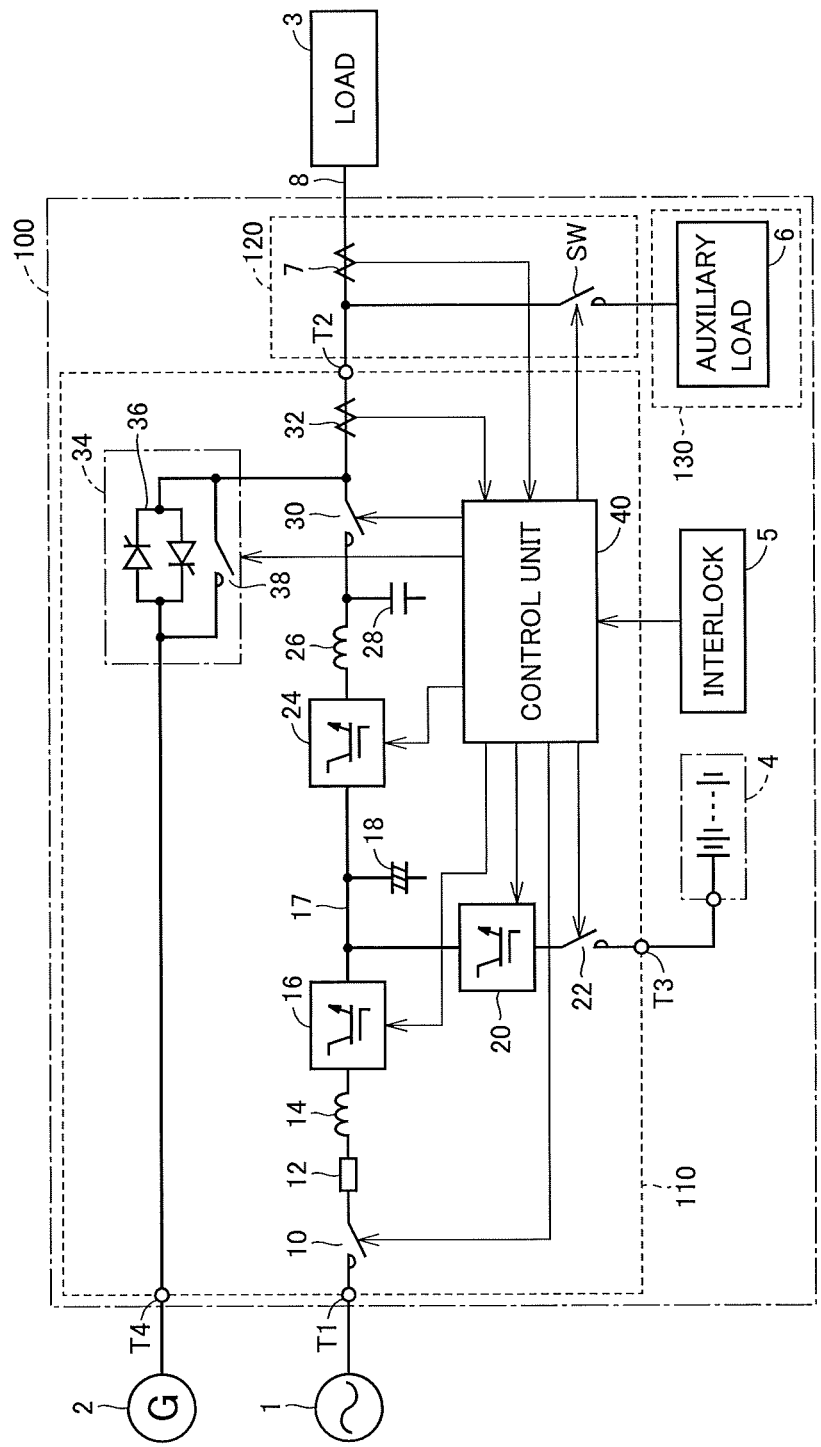
FIG. 1 is a circuit block diagram showing a configuration of an uninterruptible power supply device in accordance with a first embodiment of the present invention.

Hereinafter, embodiments of the present invention will be described in detail with reference to the drawings. It should be noted that identical or corresponding parts will be designated by the same reference numerals, and the description thereof will not be repeated.

First Embodiment

FIG. 1 is a circuit block diagram showing a configuration of an uninterruptible power supply device 100 in accordance with a first embodiment of the present invention. Referring to FIG. 1, uninterruptible power supply device 100 in accordance with the first embodiment is configured to supply AC power supplied from an AC power supply 1 or a bypass power supply 2 to a load 3. In FIG. 1, AC power supply 1 is a commercial power supply, and bypass power supply 2 is a private power generator (hereinafter simply referred to as a power generator). Commercial power supply 1 supplies AC power having a commercial frequency to uninterruptible power supply device 100. Although uninterruptible power supply device 100 is actually configured to receive three-phase AC power from commercial power supply 1 or power generator 2 and supply the three-phase AC power to load 3, FIG. 1 shows only a circuit for one phase, for simplification of the drawing and the description.

Load 3 is a motor, for example, and is driven by the AC power supplied from uninterruptible power supply device 100. Load 3 can alternately perform power running operation and regenerative operation.

Uninterruptible power supply device 100 includes an uninterruptible power supply unit 110, a switch unit 120, an auxiliary load unit 130, an interlock unit 5, and current detectors 7 and 32. Uninterruptible power supply unit 110 is connected between commercial power supply 1 and load 3. Auxiliary load unit 130 is connected to an AC bus 8 which connects uninterruptible power supply unit 110 and load 3. Switch unit 120 is connected between AC bus 8 and auxiliary load unit 130.

Uninterruptible power supply unit 110 includes an input terminal T1, an output terminal T2, a battery terminal T3, and a bypass terminal T4. Input terminal T1 receives the AC power supplied from commercial power supply 1, which is the AC power supply. Output terminal T2 is connected to load 3 via AC bus 8. Load 3 performs the power running operation using the AC power supplied from uninterruptible power supply unit 110 via AC bus 8.

Battery terminal T3 is connected to a battery 4 (power storage device). Instead of battery 4, a capacitor (such as an electric double layer capacitor or an electrolytic capacitor) may be connected. Battery 4 stores DC power. Bypass terminal T4 receives the AC power supplied from power generator 2, which is the bypass power supply.

Uninterruptible power supply device 100 further includes switches 10, 22, and 30, a fuse 12, reactors 14 and 26, a converter 16, an electrolytic capacitor 18, a bidirectional chopper 20, an inverter 24, a capacitor 28, a bypass circuit 34, and a control unit 40. Switch 10, fuse 12, reactor 14, converter 16, inverter 24, reactor 26, and switch 30 are connected in series between input terminal T1 and output terminal T2.

Switch 10 is connected between input terminal T1 and converter 16. Switch 10 is closed (turned on) in an ordinary state where the AC power is normally supplied from commercial power supply 1, and is opened (turned off) during maintenance of uninterruptible power supply unit 110, for example.

Fuse 12 is inserted into an energizing path between input terminal T1 and converter 16 to prevent an overcurrent from flowing from commercial power supply 1. Reactor 14 is provided to pass the AC power from commercial power supply 1, and to prevent a signal having a switching frequency generated in converter 16 from propagating to commercial power supply 1.

Converter 16 is configured such that, when the AC power supplied from commercial power supply 1 is normal, converter 16 converts the AC power into DC power (conversion). The DC power generated in converter 16 is output to a DC bus 17. On this occasion, converter 16 outputs a direct current to DC bus 17 such that a DC voltage of DC bus 17 becomes a target DC voltage. That is, converter 16 controls the DC voltage of DC bus 17 to have a fixed value. Further, converter 16 is configured such that, when DC power is supplied from inverter 24 via DC bus 17, converter 16 converts the DC power into AC power having the commercial frequency (inversion). Power conversion in converter 16 is controlled by control unit 40.

DC bus 17 is connected to battery terminal T3 via bidirectional chopper 20 and switch 22, and is also connected to an input terminal of inverter 24. Electrolytic capacitor 18 is connected to DC bus 17 to smooth the DC voltage of DC bus 17. Switch 22 is turned on during operation of uninterruptible power supply device 100, and is turned off during maintenance of battery 4 and uninterruptible power supply device 100.

Bidirectional chopper 20 is configured to perform bidirectional DC voltage conversion (boost and buck). When the AC power is normally supplied from commercial power supply 1, bidirectional chopper 20 stores the DC power generated by converter 16 in battery 4. On this occasion, bidirectional chopper 20 supplies a direct current to battery 4 such that a voltage between terminals of battery 4 (voltage at battery terminal T3) becomes a target battery voltage. DC voltage conversion in bidirectional chopper 20 is controlled by control unit 40.

When the AC power is normally supplied from commercial power supply 1, inverter 24 converts the DC power generated by converter 16 into AC power having the commercial frequency (inversion). In contrast, when an abnormality occurs in the AC power supplied from commercial power supply 1 (for example, when a power failure occurs), inverter 24 converts the DC power supplied from battery 4 via bidirectional chopper 20 into AC power having the commercial frequency. Inverter 24 outputs an AC voltage having a phase identical to a phase of an AC voltage supplied from commercial power supply 1. Inverter 24 outputs an alternating current such that an AC voltage at output terminal T2 becomes a target AC voltage. Further, inverter 24 is configured such that, when inverter 24 receives regenerative power from load 3, inverter 24 converts this regenerative power into DC power (conversion). Power conversion in inverter 24 is controlled by control unit 40.

Reactor 26 has one terminal connected to an AC terminal of inverter 24, and the other terminal connected to output terminal T2 via switch 30. Capacitor 28 is connected to the other terminal of reactor 26. Reactor 26 and capacitor 28 constitute a filter for removing a component having the switching frequency included in the AC power output from inverter 24.

Switch 30 is turned on in a mode in which the AC power is supplied from inverter 24 to load 3 (hereinafter also referred to as a first mode). In contrast, switch 30 is turned off in a mode in which the AC power is supplied from power generator 2, which is the bypass power supply, to load 3 via bypass circuit 34 (hereinafter also referred to as a second mode). Turning on/off of switch 30 is controlled by control unit 40.

Bypass terminal T4 receives the AC power supplied from power generator 2. Bypass circuit 34 is connected between bypass terminal T4 and output terminal T2. Bypass circuit 34 includes a semiconductor switch 36 connected between bypass terminal T4 and output terminal T2, and a switch 38 connected in parallel with semiconductor switch 36.

Semiconductor switch 36 is turned on only for a predetermined period, when the first mode is shifted to the second mode, and when the second mode is shifted to the first mode. Semiconductor switch 36 includes two thyristors. An anode and a cathode of one thyristor are connected to bypass terminal T4 and output terminal T2, respectively, and an anode and a cathode of the other thyristor are connected to output terminal T2 and bypass terminal T4, respectively. Switch 38 is turned off in the first mode, and is turned on in the second mode. Turning on/off of semiconductor switch 36 and switch 38 is controlled by control unit 40.

Interlock unit 5 is configured such that, when the bypass power supply is power generator 2, interlock unit 5 prohibits the regenerative power generated in load 3 from being returned to power generator 2 via bypass circuit 34. This can prevent power generator 2 from being broken by receiving the regenerative power.

For example, interlock unit 5 includes an operating unit to be operated by a user or an operator. Interlock unit 5 outputs, to control unit 40, a control command for permitting or prohibiting returning the regenerative power to the bypass power supply, according to the result of operation of the operating unit. In this case, the user or the operator can set, through the operating unit, whether each of the AC power supply and the bypass power supply is a commercial power supply or a private power generator, when uninterruptible power supply device 100 is installed. In the first embodiment, since the bypass power supply is set as the private power generator, interlock unit 5 outputs, to control unit 40, a control command for prohibiting returning the regenerative power to the bypass power supply.

Current detector 7 detects an instantaneous value of an alternating current flowing to load 3 (hereinafter also referred to as a load current), and outputs a signal indicating the detection value to control unit 40. Current detector 32 detects an instantaneous value of a current flowing between inverter 24 and output terminal T2 (hereinafter also referred to as an inverter output current), and outputs a signal indicating the detection value to control unit 40.

Control unit 40 determines whether load 3 is performing the power running operation or the regenerative operation, based on the output signal of current detector 7. Specifically, control unit 40 performs, for example, three-phase to two-phase conversion (for example, dq conversion) on a three-phase AC current obtained from the output signal of current detector 7, to obtain an active current and a reactive current. When the active current has a positive value (that is, when the active current is flowing into load 3), control unit 40 determines that load 3 is performing the power running operation. In contrast, when the active current has a negative value (that is, when the active current is flowing out of load 3), control unit 40 determines that load 3 is performing the regenerative operation.

When load 3 is performing the power running operation, control unit 40 controls turning on/off of switches 10, 22, 30 and bypass circuit 34 and power conversion in converter 16 and inverter 24, such that uninterruptible power supply unit 110 selectively performs the first mode and the second mode.

When load 3 is performing the regenerative operation, in a case where commercial power supply 1 can recover the regenerative power generated by load 3, control unit 40 controls power conversion in converter 16 and inverter 24 to supply the regenerative power to commercial power supply 1 via uninterruptible power supply unit 110. In contrast, in a case where commercial power supply 1 cannot recover the power, control unit 40 causes auxiliary load unit 130 to consume the regenerative power, as described later.

Auxiliary load unit 130 has at least one auxiliary load 6. In the example in FIG. 1, auxiliary load unit 130 has one auxiliary load 6. Auxiliary load 6 is used to consume the regenerative power generated in load 3. For example, auxiliary load 6 includes a resistive element or an inductor element. The resistive element (or inductor element) has one terminal electrically connected to AC bus 8, and the other terminal electrically connected to a grounding wire not shown.

Switch unit 120 has at least one switch SW. In the example in FIG. 1, switch unit 120 has one switch SW. For example, switch SW is a contactor. Switch SW has one terminal connected to AC bus 8, and the other terminal connected to auxiliary load 6. Turning on/off of switch SW is controlled by control unit 40.

Next, operation of uninterruptible power supply device 100 in accordance with the first embodiment will be described. First, operation when the first mode is selected will be described. In this case, switch 30 is turned on and inverter 24 and output terminal T2 are electrically connected, whereas bypass circuit 34 is turned off and bypass terminal T4 and output terminal T2 are electrically disconnected.

When load 3 performs power running operation, an active current flows from AC bus 8 into load 3. When control unit 40 determines based on an output signal of current detector 7 that load 3 is performing the power running operation, control unit 40 causes uninterruptible power supply unit 110 to perform the first mode.

In the first mode, when AC power is normally supplied from commercial power supply 1, the AC power from commercial power supply 1 is supplied to converter 16 via switch 10, fuse 12, and reactor 14, and is converted into DC power by converter 16. The DC power generated by converter 16 is stored in battery 4 via bidirectional chopper 20 and switch 22.

Inverter 24 converts the DC power generated by converter 16 into AC power. Load 3 receives the AC power supplied from commercial power supply 1 and performs the power running operation.

When the AC power supplied from commercial power supply 1 becomes abnormal, operation of converter 16 is stopped, and the DC power in battery 4 is supplied to inverter 24 via switch 22 and bidirectional chopper 20, and is converted into AC power by inverter 24.

The AC power generated by inverter 24 is supplied to load 3 via reactor 26 and switch 30. When the voltage between the terminals of battery 4 decreases to reach a discharge cutoff voltage, operation of bidirectional chopper 20 and inverter 24 is stopped.

Next, operation when the second mode is selected will be described. In this case, bypass circuit 34 is turned on and bypass terminal T4 and output terminal T2 are electrically connected, whereas switch 30 is turned off and inverter 24 and output terminal T2 are electrically disconnected.

When control unit 40 determines based on an output signal of current detector 7 that load 3 is performing power running operation, control unit 40 causes uninterruptible power supply unit 110 to perform the second mode. In the second mode, when AC power is normally supplied from power generator 2, the AC power from power generator 2 is supplied to load 3 via bypass circuit 34. Load 3 receives the AC power supplied from power generator 2 and performs the power running operation.

When the AC power supplied from power generator 2 becomes abnormal, the second mode is switched to the first mode. In this case, the DC power in battery 4 is converted into AC power by inverter 24, and is supplied to load 3. Therefore, even when an abnormality occurs in power generator 2, it is possible to continue the power running operation of load 3 for a period during which the DC power is stored in battery 4.

Here, when load 3 performs regenerative operation, regenerative power is generated in load 3, and an active current flows out of load 3 to output terminal T2 via AC bus 8. When control unit 40 determines based on an output signal of current detector 7 that load 3 is performing the regenerative operation, control unit 40 then determines whether or not at least one of the AC power supply and the bypass power supply can recover the regenerative power.

In the first embodiment, returning the regenerative power to power generator 2, which is the bypass power supply, is prohibited by interlock unit 5. Therefore, control unit 40 determines whether or not commercial power supply 1, which is the AC power supply, can recover the regenerative power.

Specifically, control unit 40 detects an abnormality in commercial power supply 1 by monitoring an AC voltage supplied from commercial power supply 1 to input terminal T1. For example, during a power failure in commercial power supply 1, an effective value of the AC voltage supplied from commercial power supply 1 abnormally decreases. Control unit 40 detects based on the decrease of the AC voltage that the AC power from commercial power supply 1 becomes abnormal. When the AC power from commercial power supply 1 becomes abnormal, control unit 40 determines that commercial power supply 1 cannot recover the regenerative power.

In contrast, when the AC power is normally supplied from commercial power supply 1, control unit 40 determines that commercial power supply 1 can recover the regenerative power. Based on the determined result, control unit 40 processes the regenerative power generated in load 3, by performing operation according to the following description.

Figure 2:
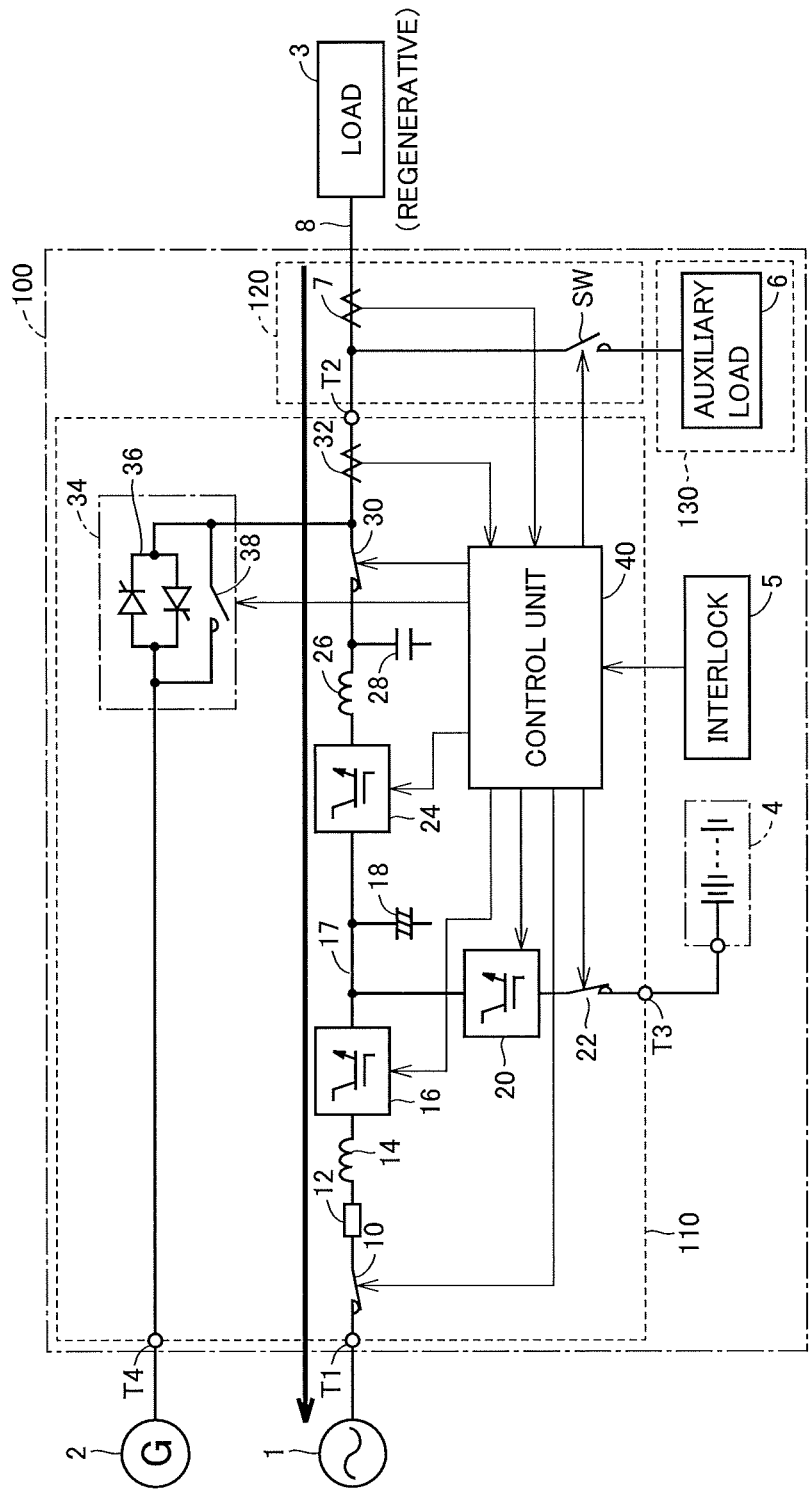
FIG. 2 is a diagram showing a flow of regenerative power in a case where a commercial power supply can recover the regenerative power.

(1) In a Case where Commercial Power Supply 1 can Recover the Regenerative Power FIG. 2 is a diagram showing a flow of regenerative power in a case where commercial power supply 1 can recover the regenerative power. In FIG. 2, the flow of the regenerative power is indicated by an arrow.

When load 3 is performing the regenerative operation, control unit 40 turns on switches 10, 22, and 30, and turns off switch SW. Output terminal T2 of uninterruptible power supply unit 110 receives the regenerative power generated in load 3.

In uninterruptible power supply unit 110, inverter 24 converts the regenerative power supplied from output terminal T2 into DC power (conversion). Converter 16 converts the DC power generated by inverter 24 into AC power in synchronization with the commercial frequency (inversion). The AC power generated by converter 16 is output from input terminal T1 and is supplied to commercial power supply 1. Conversion in inverter 24 and inversion in converter 16 are controlled by control unit 40.

(2) In a Case where Commercial Power Supply 1 Cannot Recover the Regenerative Power When the AC power from commercial power supply 1 becomes abnormal, it is not possible to return the regenerative power generated in load 3 to commercial power supply 1. Further, it is also prohibited by interlock unit 5 to return the regenerative power to power generator 2, which is the bypass power supply.

Figure 3:
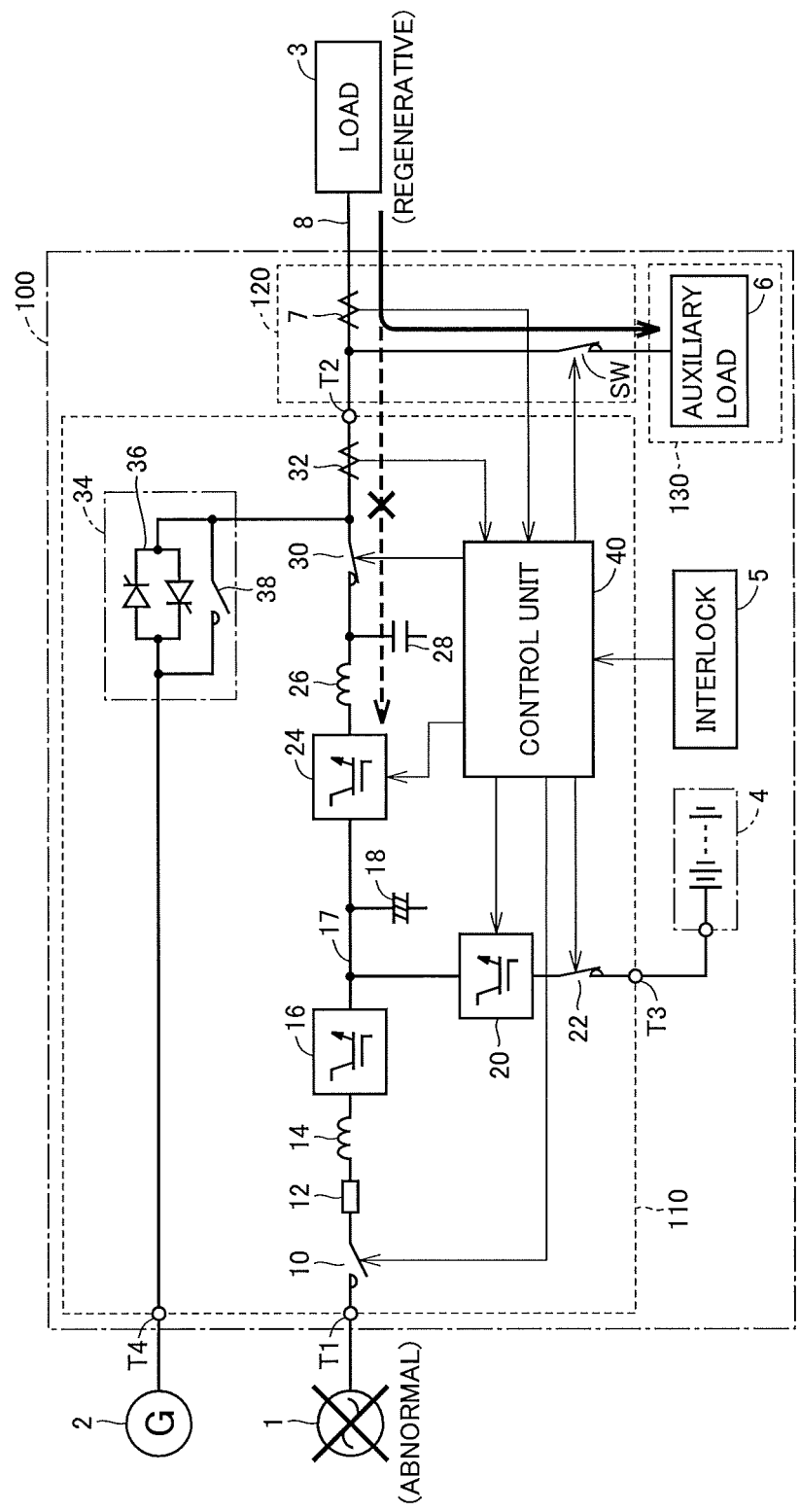
FIG. 3 is a diagram showing a flow of regenerative power in a case where the commercial power supply cannot recover the regenerative power.

FIG. 3 is a diagram showing a flow of regenerative power in a case where commercial power supply 1 cannot recover the regenerative power. In FIG. 3, the flow of the regenerative power is indicated by an arrow.

As shown in FIG. 3, when control unit 40 determines that load 3 is performing the regenerative operation, control unit 40 turns on switch SW of switch unit 120. Thereby, the regenerative power is not supplied to output terminal T2 of uninterruptible power supply unit 110, but is supplied to auxiliary load unit 130. Control unit 40 causes auxiliary load 6 to consume the regenerative power. In this case, operation of inverter 24 and converter 16 is stopped.

When load 3 switches from the regenerative operation to the power running operation, control unit 40 turns off switch SW to electrically disconnect auxiliary load 6 from AC bus 8. Alternatively, during the regenerative operation of load 3, when the AC power from commercial power supply 1 is restored to a normal state, that is, when commercial power supply 1 is restored to a state where it can recover the regenerative power, control unit 40 turns off switch SW to electrically disconnect auxiliary load 6 from AC bus 8.

Figure 4:
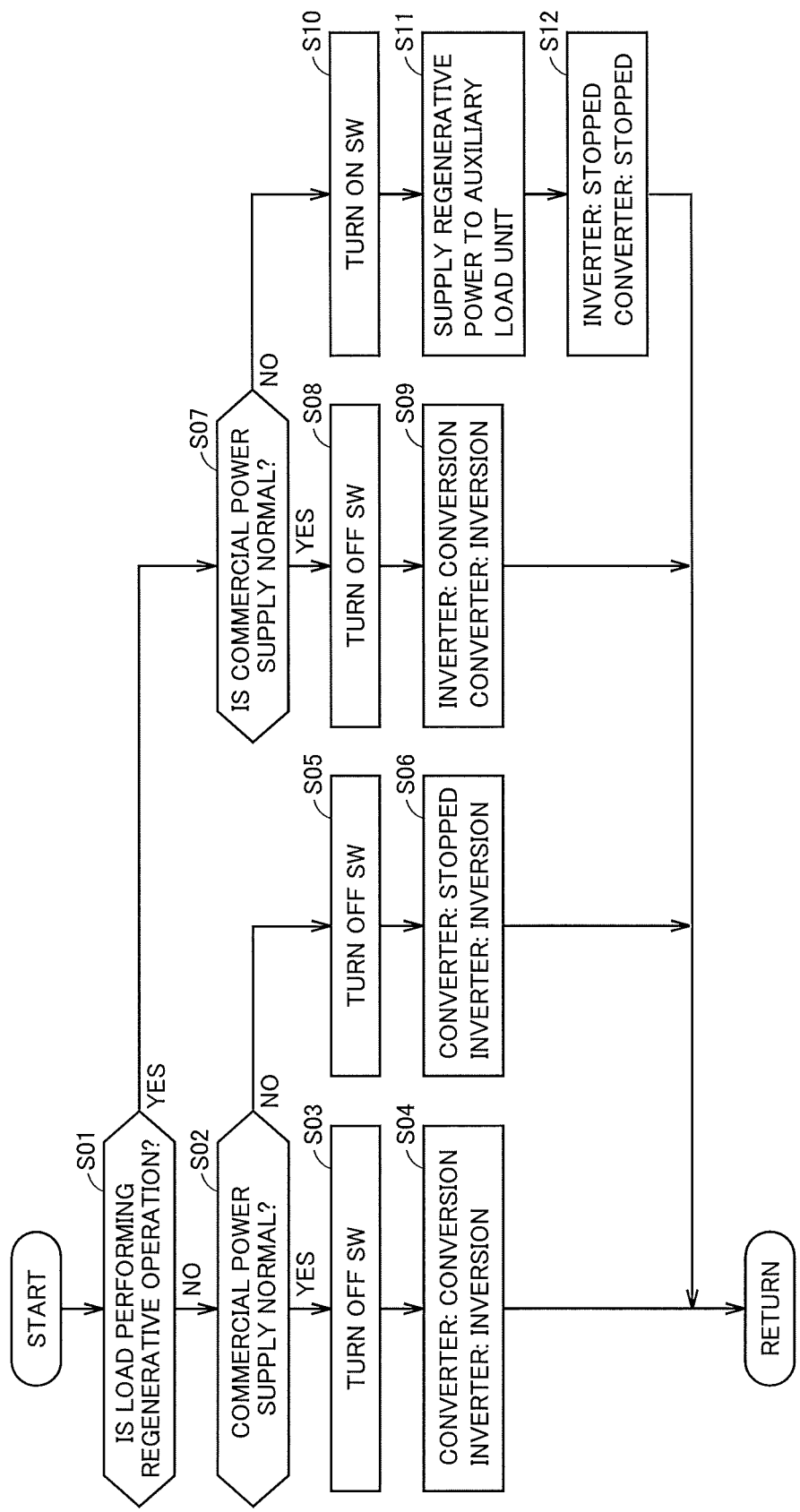
FIG. 4 is a flowchart for illustrating control performed by a control unit shown in FIG. 1.

FIG. 4 is a flowchart for illustrating control performed by control unit 40 shown in FIG. 1. The flowchart in FIG. 4 shows control performed by control unit 40 in the first mode. Processing in the flowchart in FIG. 4 is invoked from a main routine and performed at regular time intervals or whenever predetermined conditions are satisfied.

Referring to FIG. 4, in step S01, control unit 40 determines whether or not load 3 is performing regenerative operation, based on an output signal of current detector 7. When load 3 is not performing regenerative operation, i.e., when load 3 is performing power running operation (NO in S02), control unit 40 proceeds to step S02, and determines whether or not AC power from commercial power supply 1 is normal.

When the AC power from commercial power supply 1 is normal (YES in S02), in step S03, control unit 40 turns off switch SW of switch unit 120. In step S04, converter 16 converts the AC power from commercial power supply 1 into DC power. The DC power generated by converter 16 is stored in battery 4 via bidirectional chopper 20 and switch 22. Inverter 24 converts the DC power generated by converter 16 into AC power. Control unit 40 controls conversion in converter 16 and inversion in inverter 24. Thereby, load 3 receives the AC power supplied from commercial power supply 1 and performs the power running operation.

When the AC power from commercial power supply 1 becomes abnormal (NO in S02), in step S05, control unit 40 turns off switch SW of switch unit 120. In step S06, inverter 24 converts the DC power stored in battery 4 into AC power. On this occasion, operation of converter 16 is stopped. Control unit 40 controls inversion in inverter 24. Thereby, load 3 receives power supply from battery 4 and performs the power running operation.

In contrast, when load 3 is performing the regenerative operation (YES in S01), control unit 40 proceeds to step S07, and determines whether or not the AC power from commercial power supply 1 is normal. When the AC power from commercial power supply 1 is normal (YES in S07), in step S08, control unit 40 turns off switch SW of switch unit 120. In step S09, inverter 24 converts regenerative power generated in load 3 into DC power (conversion). Converter 16 converts the DC power generated by inverter 24 into AC power (inversion). Control unit 40 controls conversion in inverter 24 and inversion in converter 16. Thereby, the regenerative power generated in load 3 is returned to commercial power supply 1.

When the AC power from commercial power supply 1 becomes abnormal (NO in S07) during the regenerative operation of load 3, control unit 40 proceeds to step S10, and turns on switch SW of switch unit 120. Thereby, the regenerative power is supplied to auxiliary load 6. In step S11, control unit 40 causes auxiliary load 6 to consume the regenerative power. In step S12, control unit 40 stops operation of inverter 24 and converter 16.

As described above, according to the uninterruptible power supply device in accordance with the first embodiment of the present invention, during the regenerative operation of load 3, in a case where the AC power supply and the bypass power supply cannot recover the regenerative power generated in load 3, the regenerative power is consumed by auxiliary load unit 130. Such a configuration can suppress the regenerative power from returning to the AC power supply and the bypass power supply, and thus can suppress an increase in the DC voltage of DC bus 17. This can prevent a situation where DC bus 17 has an overvoltage and thereby converter 16 and inverter 24 are stopped for overvoltage protection.

Second Embodiment

In a case where the regenerative power generated in load 3 fluctuates, in uninterruptible power supply device 100 in accordance with the first embodiment, when the regenerative power increases, all the regenerative power cannot be consumed by auxiliary load unit 130, and surplus power may be returned to commercial power supply 1. Alternatively, when the regenerative power decreases, a deficiency in the regenerative power relative to power consumption in auxiliary load unit 130 may be extracted from battery 4. This problem is solved in a second embodiment.

Figure 5:
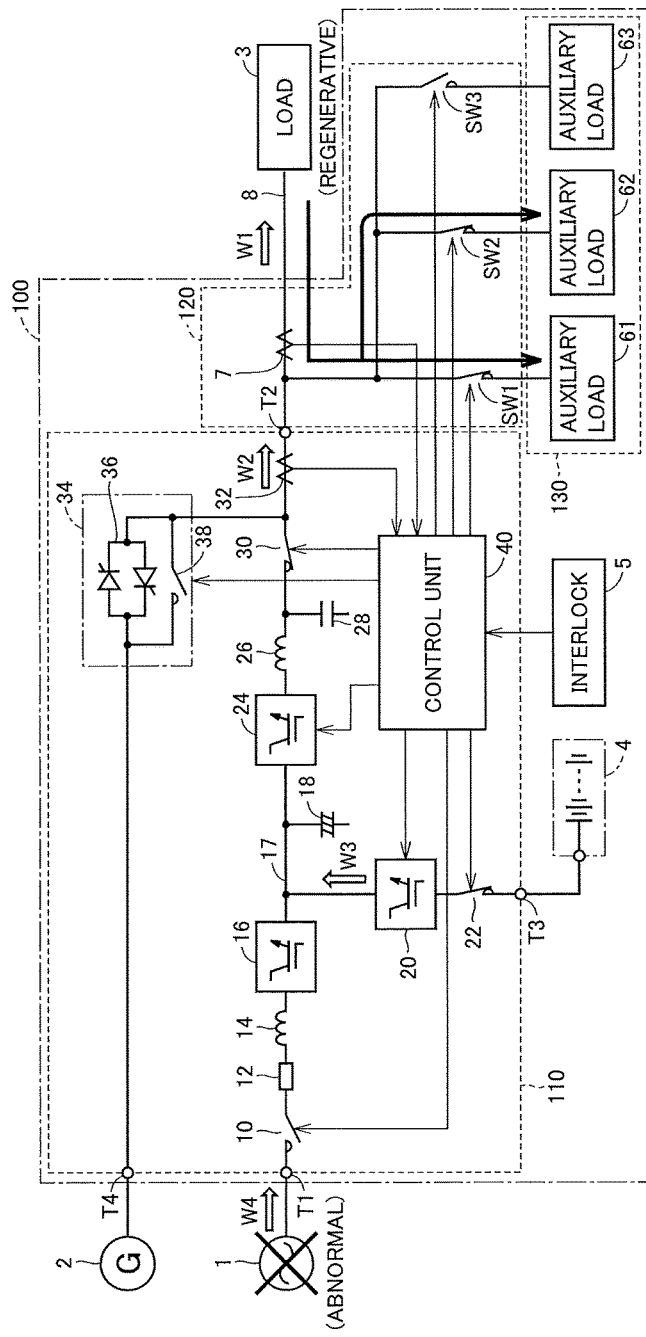
FIG. 5 is a circuit block diagram showing a configuration of an uninterruptible power supply device in accordance with a second embodiment of the present invention.

FIG. 5 is a circuit block diagram showing a configuration of uninterruptible power supply device 100 in accordance with a second embodiment of the present invention. Referring to FIG. 5, the uninterruptible power supply device in accordance with the second embodiment is different from uninterruptible power supply device 100 in accordance with the first embodiment shown in FIG. 1 in that auxiliary load unit 130 includes a plurality of auxiliary loads 61 to 63 and switch unit 120 includes a plurality of switches SW1 to SW3. Although the number of auxiliary loads and the number of switches are set to three in the example in FIG. 5, the number of auxiliary loads and the number of switches may be set to two, or may be set to four or more.

Each of auxiliary loads 61 to 63 includes a resistive element or an inductor element. Each resistive element (or inductor element) has one terminal electrically connected to AC bus 8, and the other terminal electrically connected to a grounding wire not shown.

Switches SW1 to SW3 are connected between AC bus 8 and auxiliary loads 61 to 63, respectively. Specifically, switch SW1 has one terminal electrically connected to AC bus 8, and the other terminal electrically connected to auxiliary load 61. Switch SW2 has one terminal electrically connected to AC bus 8, and the other terminal electrically connected to auxiliary load 62. Switch SW3 has one terminal electrically connected to AC bus 8, and the other terminal electrically connected to auxiliary load 63. For example, each of switches SW1 to SW3 is a contactor.

That is, in uninterruptible power supply device 100 in accordance with the second embodiment, the plurality of auxiliary loads 61 to 63 are connected in parallel with each other with respect to AC bus 8, via switches SW1 to SW3, respectively. Turning on/off of switches SW1 to SW3 is controlled by control unit 40.

Next, operation of uninterruptible power supply device 100 in accordance with the second embodiment will be described.

In uninterruptible power supply device 100 in accordance with the second embodiment, operation in a case where load 3 is performing power running operation, and operation in a case where load 3 is performing regenerative operation and commercial power supply 1 can recover regenerative power (that is, AC power is normally supplied from commercial power supply 1) are the same as those in uninterruptible power supply device 100 in accordance with the first embodiment, and thus the description thereof will not be repeated. In the following, a description will be given on operation in a case where load 3 is performing regenerative operation and commercial power supply 1 cannot recover regenerative power.

Using FIG. 5, a flow of regenerative power in a case where commercial power supply 1 cannot recover the regenerative power will be described. In FIG. 5, the flow of the regenerative power is indicated by arrows.

As shown in FIG. 5, in a case where the AC power from commercial power supply 1 becomes abnormal, when control unit 40 determines that load 3 is performing the regenerative operation, control unit 40 turns on switches SW1 to SW3 of switch unit 120. Specifically, while the regenerative power is increasing, control unit 40 sequentially turns on switches SW1 to SW3. Further, while the regenerative power is decreasing, control unit 40 sequentially turns off switches SW1 to SW3. Control unit 40 can equalize the regenerative power generated in load 3 with the power consumption in entire auxiliary load unit 130, by controlling turning on/off of switches SW1 to SW3 based on the magnitude of the regenerative power.

Figure 6:
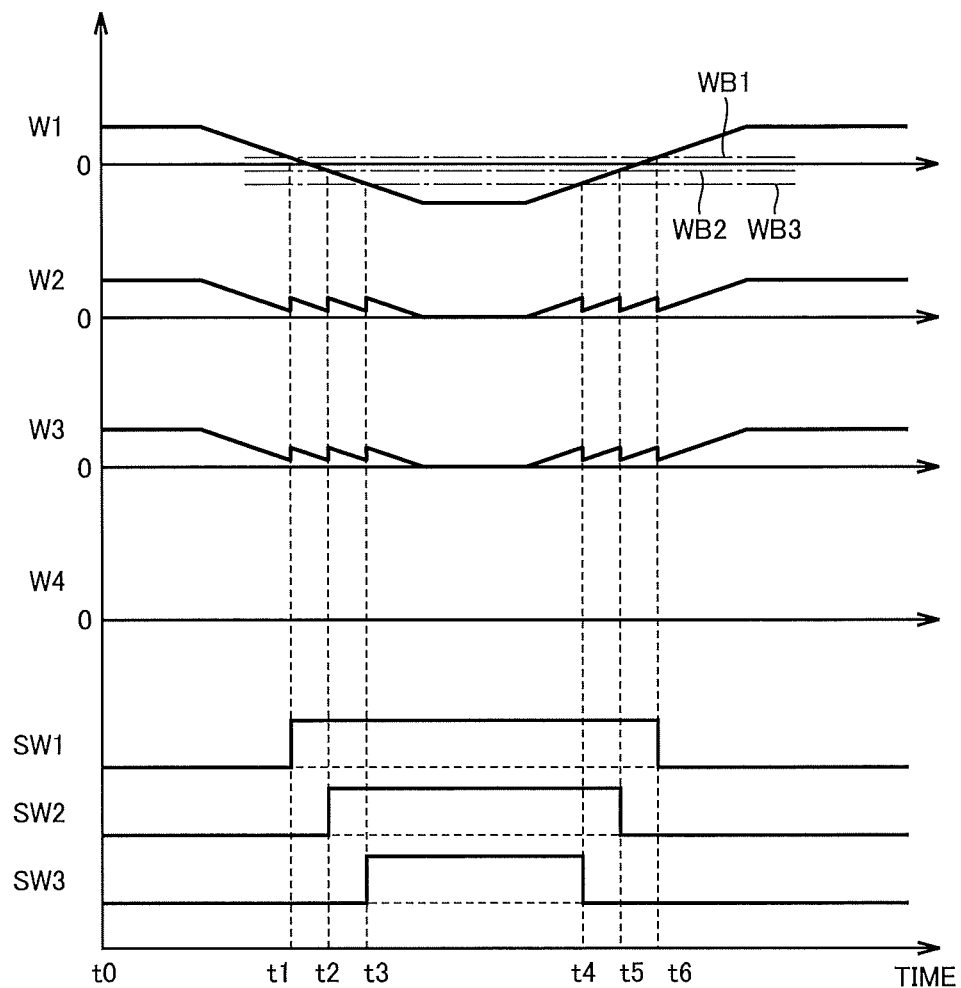
FIG. 6 is a waveform diagram for illustrating control of a switch unit in a control unit shown in FIG. 5.

FIG. 6 is a waveform diagram for illustrating control of switch unit 120 in control unit 40. In FIGS. 5 and 6, power W1 indicates input/output power of load 3 (hereinafter also referred to as load power). Control unit 40 can calculate load power W1 based on a load current detected by current detector 7 and a voltage of AC bus 8. Regarding load power W1, its power value during the power running operation of load 3 is indicated by a positive value, and its power value during the regenerative operation of load 3 is indicated by a negative value.

Power W2 indicates input/output power of uninterruptible power supply unit 110 (hereinafter also referred to as UPS power). Control unit 40 can calculate UPS power W2 based on an inverter output current detected by current detector 32 and the voltage of AC bus 8. Regarding UPS power W2, its power value during power output to AC bus 8 is indicated by a positive value, and its power value during power input from AC bus 8 is indicated by a negative value.

Power W3 indicates input/output power of battery 4 (hereinafter also referred to as battery power). Control unit 40 can calculate battery power W3 based on a current flowing to battery 4 and a voltage between the terminals of battery 4. Regarding battery power W3, its power value during discharging of battery 4 is indicated by a positive value, and its power value during charging of battery 4 is indicated by a negative value.

Power W4 indicates input/output power of commercial power supply 1 (hereinafter also referred to as power supply power). Control unit 40 can calculate power supply power W4 based on a current flowing to input terminal T1 and a voltage at input terminal T1. Regarding power supply power W4, its power value during power supply to uninterruptible power supply unit 110 is indicated by a positive value, and its power value during power recovery from uninterruptible power supply unit 110 is indicated by a negative value.

Referring to FIG. 6, load 3 performs the power running operation for a time period from a time point t0 to a time point t1 and a time period after a time point t6, and performs the regenerative operation for a time period from time point t1 to time point t6.

During the power running operation of load 3, since commercial power supply 1 is abnormal, the DC power stored in battery 4 is converted into AC power by inverter 24, and is supplied to load 3. Therefore, during the power running operation, load power W1, UPS power W2, and battery power W3 are equal. Power supply power W4 is 0.

When load 3 switches from the power running operation to the regenerative operation at time point t1, control unit 40 first turns on one switch SW1 of switches SW1 to SW3. While the magnitude (corresponding to the absolute value) of load power W1 is increasing after time point t1, control unit 40 sequentially turns on remaining switches SW2 and SW3.

Specifically, control unit 40 has three threshold values WB1, WB2, and WB3 for controlling turning on/off of switches SW1 to SW3. First threshold value WB1 has the largest absolute value, and third threshold value WB3 has the largest absolute value (|WB1|<|WB2|<|WB3|).

When load power W1 is more than second threshold value WB2 and is less than or equal to first threshold value WB1 (WB2≤W1<WB1), control unit 40 turns on switch SW1. When load power W1 is more than third threshold value WB3 and is less than or equal to second threshold value WB2 (WB3<W1≤WB2), control unit 40 turns on switches SW1 and SW2. When load power W1 is less than or equal to third threshold value WB3 (W1≤WB3), control unit 40 turns on switches SW1 to SW3.

In the example in FIG. 6, switch SW1 is turned on at time point t1, then switch SW2 is further turned on at time point t2 later than time point t1, and then switch SW3 is further turned on at time point t3 later than time point t2. That is, switches SW1 to SW3 are sequentially turned on as the magnitude of the regenerative power increases.

Thus, since the regenerative power is supplied to auxiliary load unit 130 via switches SW which are turned on sequentially, power having a magnitude equal to that of the regenerative power is consumed in auxiliary load unit 130.

As a result, UPS power W2 does not have a negative value, and accordingly, battery power W3 does not have a negative value, either. Therefore, an increase in the DC voltage of DC bus 17 can be suppressed.

When the power consumption in auxiliary load unit 130 becomes larger than the regenerative power, uninterruptible power supply unit 110 compensates for a deficiency in the power consumption, and the power stored in battery 4 may be consumed wastefully. In the second embodiment, power extraction from battery 4 can be prevented by equalizing the regenerative power with the power consumption in auxiliary load unit 130.

It should be noted that, in the example in FIG. 6, UPS power W2 and battery power W3 temporarily increase at timing at which each of switches SW1 to SW3 is turned on (corresponding to time points t1, t2, t3). This is because a state where the power consumption in auxiliary load unit 130 becomes larger than load power W1 (regenerative power) temporarily occurs at timing at which switch SW is turned on. For example, when auxiliary loads 61, 62, and 63 have power consumptions WC1, WC2, and WC3, respectively, since W1<WC1 at time point t1, UPS power W2 (that is, battery power W3) covers power corresponding to a difference between W1 and WC1. Accordingly, at time point t1, UPS power W2 and battery power W3 temporarily increase. Similarly, since W1<WC1+WC2 at time point t2, UPS power W2 covers power corresponding to a difference between W1 and (WC1+WC2), and thus UPS power W2 and battery power W3 temporarily increase. However, when the magnitude of the regenerative power increases after the timing at which switch SW is turned on, UPS power W2 decreases toward 0, and thus power extraction from battery 4 does not occur.

Further, while the magnitude of load power W1 is decreasing during the regenerative operation of load 3, control unit 40 sequentially turns off switches SW1 to SW3. Specifically, when load power W1 becomes more than third threshold value WB3 and less than or equal to second threshold value WB2, control unit 40 turns off switch SW3. When load power W1 becomes more than second threshold value WB2 and less than or equal to first threshold value WB1, control unit 40 turns off switches SW2 and SW3. When load power W1 becomes more than first threshold value WB1, control unit 40 turns off switches SW1 to SW3.

In the example in FIG. 6, switch SW3 is turned off at time point t4, then switch SW2 is further turned off at time point t5 later than time point t4, and then switch SW1 is further turned off at time point t6 later than time point t5. That is, switches SW1 to SW3 are sequentially turned off as the magnitude of the regenerative power decreases.

As described above, when the power consumption in auxiliary load unit 130 becomes larger than the regenerative power, uninterruptible power supply unit 110 compensates for a deficiency in the power consumption, and the power stored in battery 4 may be consumed wastefully. According to the third embodiment, even while the regenerative power is decreasing, the power having a magnitude equal to that of the regenerative power is consumed in auxiliary load unit 130. Therefore, power extraction from battery 4 can be prevented.

Figure 7:
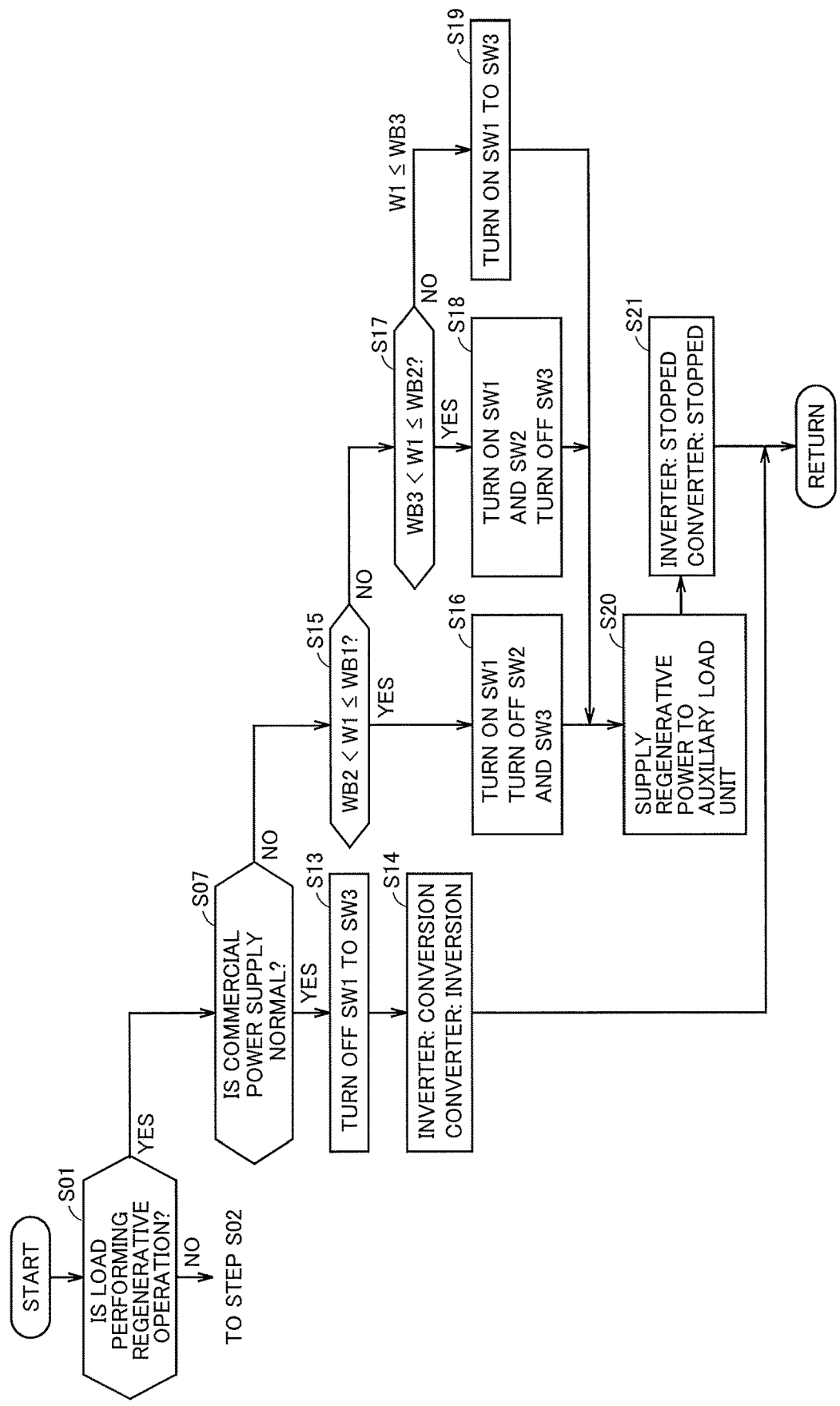
FIG. 7 is a flowchart for illustrating control performed by the control unit shown in FIG. 5.

FIG. 7 is a flowchart for illustrating control performed by control unit 40 shown in FIG. 5. Processing in this flowchart is invoked from a main routine and performed at regular time intervals or whenever predetermined conditions are satisfied.

The flowchart shown in FIG. 7 includes processing in steps S13 to S21, instead of the processing in steps S08 to S12 in the flowchart shown in FIG. 4. It should be noted that FIG. 7 does not show processing in steps S02 to S06 which is common to that in FIG. 4.

Referring to FIG. 7, when load 3 is performing regenerative operation (YES in S01) and commercial power supply 1 is normal (YES in S07), control unit 40 proceeds to step S13 and turns off switches SW1 to SW3 of switch unit 120. In step S14, inverter 24 converts regenerative power generated in load 3 into DC power. Converter 16 converts the DC power generated by inverter 24 into AC power. Control unit 40 controls conversion in inverter 24 and inversion in converter 16. Thereby, the regenerative power generated in load 3 is returned to commercial power supply 1.

In contrast, when AC power from commercial power supply 1 becomes abnormal (NO in S07) during the regenerative operation of load 3, control unit 40 controls turning on/off of switches SW1 to SW3 of switch unit 120 based on load power W1 (regenerative power). Specifically, in step S15, control unit 40 determines whether or not load power W1 satisfies the relation of WB2<W1≤WB1. When load power W1 satisfies the relation in step S15 (YES in S15), control unit 40 proceeds to step S16, and turns on switch SW1 and turns off switches SW2 and SW3. Thereby, the regenerative power is supplied to auxiliary load 61. In step S20, control unit 40 causes auxiliary load 61 to consume the regenerative power. In step S21, control unit 40 stops operation of inverter 24 and converter 16.

In contrast, when load power W1 does not satisfy the relation in step S15 (NO in S15), control unit 40 then determines in step S17 whether or not load power W1 satisfies the relation of WB3<W1≤WB2. When load power W1 satisfies the relation in step S17 (YES in S17), control unit 40 proceeds to step S18, and turns on switches SW1 and SW2 and turns off switch SW3. Thereby, the regenerative power is supplied to auxiliary loads 61 and 62. In this case, in step S20, control unit 40 causes auxiliary loads 61 and 62 to consume the regenerative power.

When load power W1 does not satisfy the relation in step S17 (NO in S17), that is, when load power W1 satisfies the relation of W1≤WB3, control unit 40 proceeds to step S19, and turns on steps SW1 to SW3. Thereby, the regenerative power is supplied to auxiliary loads 61 to 63. In this case, in step S20, control unit 40 causes auxiliary loads 61 to 63 to consume the regenerative power.

As described above, according to the uninterruptible power supply device in accordance with the second embodiment of the present invention, also in the case where the regenerative power generated in load 3 fluctuates, the regenerative power can be consumed by auxiliary load unit 130. Therefore, the same effect as that of the uninterruptible power supply device in accordance with the first embodiment can be obtained.

Third Embodiment

Figure 8:
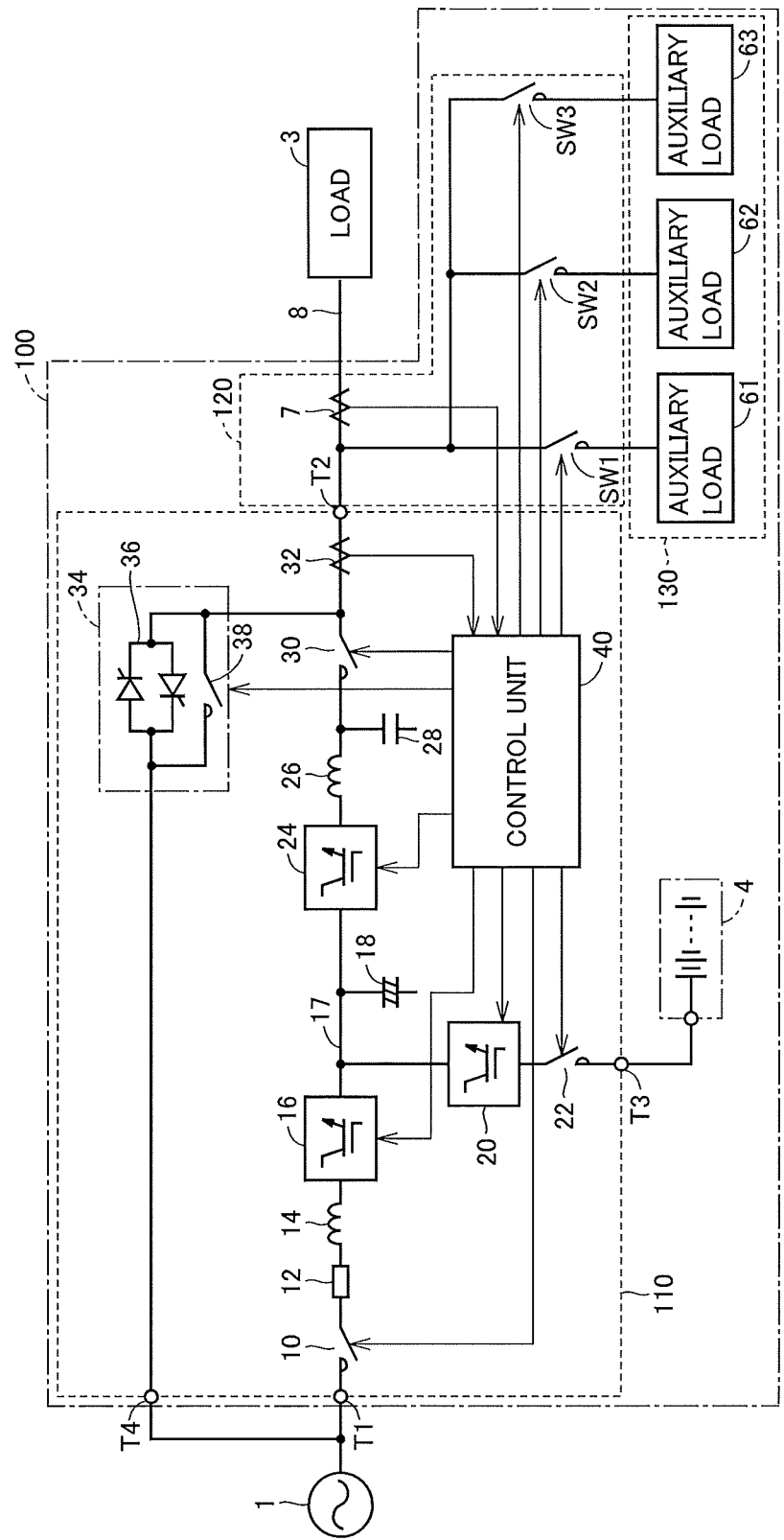
FIG. 8 is a circuit block diagram showing a configuration of an uninterruptible power supply device in accordance with a third embodiment of the present invention.

FIG. 8 is a circuit block diagram showing a configuration of uninterruptible power supply device 100 in accordance with a third embodiment of the present invention, which is compared with FIG. 5. Referring to FIG. 8, this uninterruptible power supply device 100 is different from uninterruptible power supply device 100 in FIG. 5 in that bypass terminal T4 receives AC power supplied from an AC power supply, instead of a bypass power supply, and interlock unit 5 is not included. In FIG. 8, an AC power supply is commercial power supply 1.

Next, operation of uninterruptible power supply device 100 in accordance with the third embodiment will be described. Since operation in a case where the first mode is selected is the same as that in uninterruptible power supply device 100 in FIG. 5, a description will be given on operation in a case where the second mode is selected.

When the second mode is selected, bypass circuit 34 is turned on and bypass terminal T4 and output terminal T2 are electrically connected, whereas switch 30 is turned off and inverter 24 and output terminal T2 are electrically disconnected. When control unit 40 determines based on an output signal of current detector 7 that load 3 is performing power running operation, control unit 40 causes uninterruptible power supply unit 110 to perform the second mode.

In the second mode, when AC power is normally supplied from commercial power supply 1, the AC power from commercial power supply 1 is supplied to load 3 via bypass circuit 34. Load 3 receives the AC power supplied from commercial power supply 1 and performs the power running operation.

When the AC power supplied from commercial power supply 1 becomes abnormal, the second mode is switched to the first mode. In this case, the DC power in battery 4 is converted into AC power by inverter 24, and is supplied to load 3. Therefore, even when an abnormality occurs in commercial power supply 1, it is possible to continue the power running operation of load 3 for a period during which the DC power is stored in battery 4.

Here, when load 3 performs regenerative operation, regenerative power is generated in load 3, and an active current flows out of load 3 to output terminal T2 via AC bus 8. When control unit 40 determines based on an output signal of current detector 7 that load 3 is performing the regenerative operation, control unit 40 then determines whether or not commercial power supply 1 can recover the regenerative power.

Specifically, control unit 40 detects an abnormality in commercial power supply 1 by monitoring an AC voltage supplied from commercial power supply 1 to input terminal T1. When the AC power from commercial power supply 1 becomes abnormal, control unit 40 determines that commercial power supply 1 cannot recover the regenerative power.

In contrast, when the AC power is normally supplied from commercial power supply 1, control unit 40 determines that commercial power supply 1 can recover the regenerative power. Based on the determined result, control unit 40 processes the regenerative power generated in load 3, by performing operation according to the following description.

Figure 9:
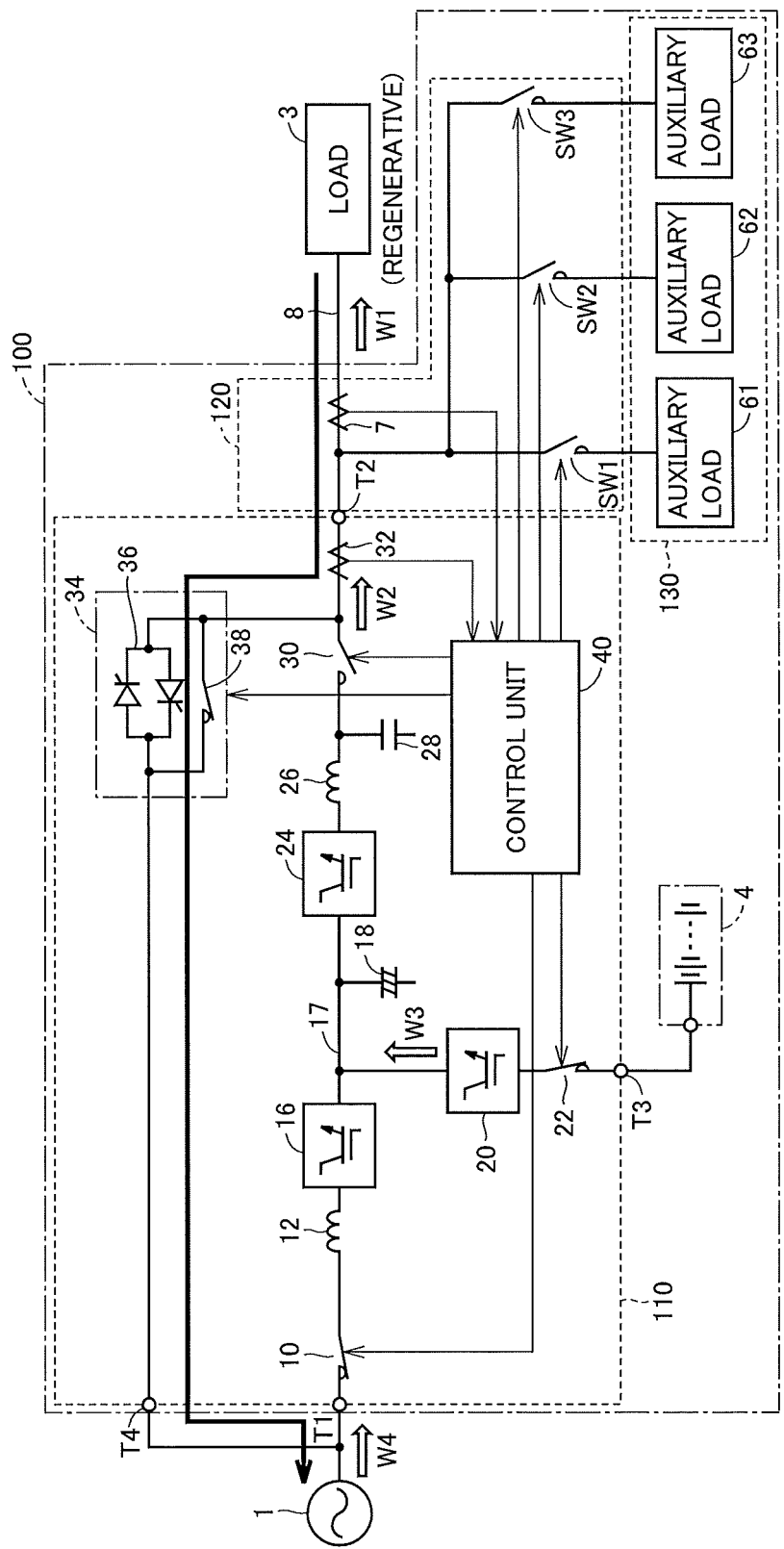
FIG. 9 is a diagram showing a flow of regenerative power in a case where a commercial power supply can recover the regenerative power.

(1) In a Case where Commercial Power Supply 1 can Recover the Regenerative Power FIG. 9 is a diagram showing a flow of regenerative power in a case where commercial power supply 1 can recover the regenerative power. In FIG. 9, the flow of the regenerative power is indicated by an arrow.

When load 3 is performing the regenerative operation, control unit 40 turns on bypass circuit 34, and turns off switch 30 and switches SW1 to SW3. Output terminal T2 of uninterruptible power supply unit 110 receives the regenerative power generated in load 3.

In uninterruptible power supply unit 110, the regenerative power supplied from output terminal T2 is guided to bypass terminal T4 via bypass circuit 34. The regenerative power is output from bypass terminal T4, and is supplied to commercial power supply 1.

When the regenerative power is returned to commercial power supply 1 via inverter 24 and converter 16 (see FIG. 3), power loss occurs in each of inverter 24 and converter 16. Accordingly, the efficiency of recovering the regenerative power may be reduced. In contrast, by returning the regenerative power to commercial power supply 1 via bypass circuit 34 as shown in FIG. 9, it is possible to efficiently recover the regenerative power.

Figure 10:
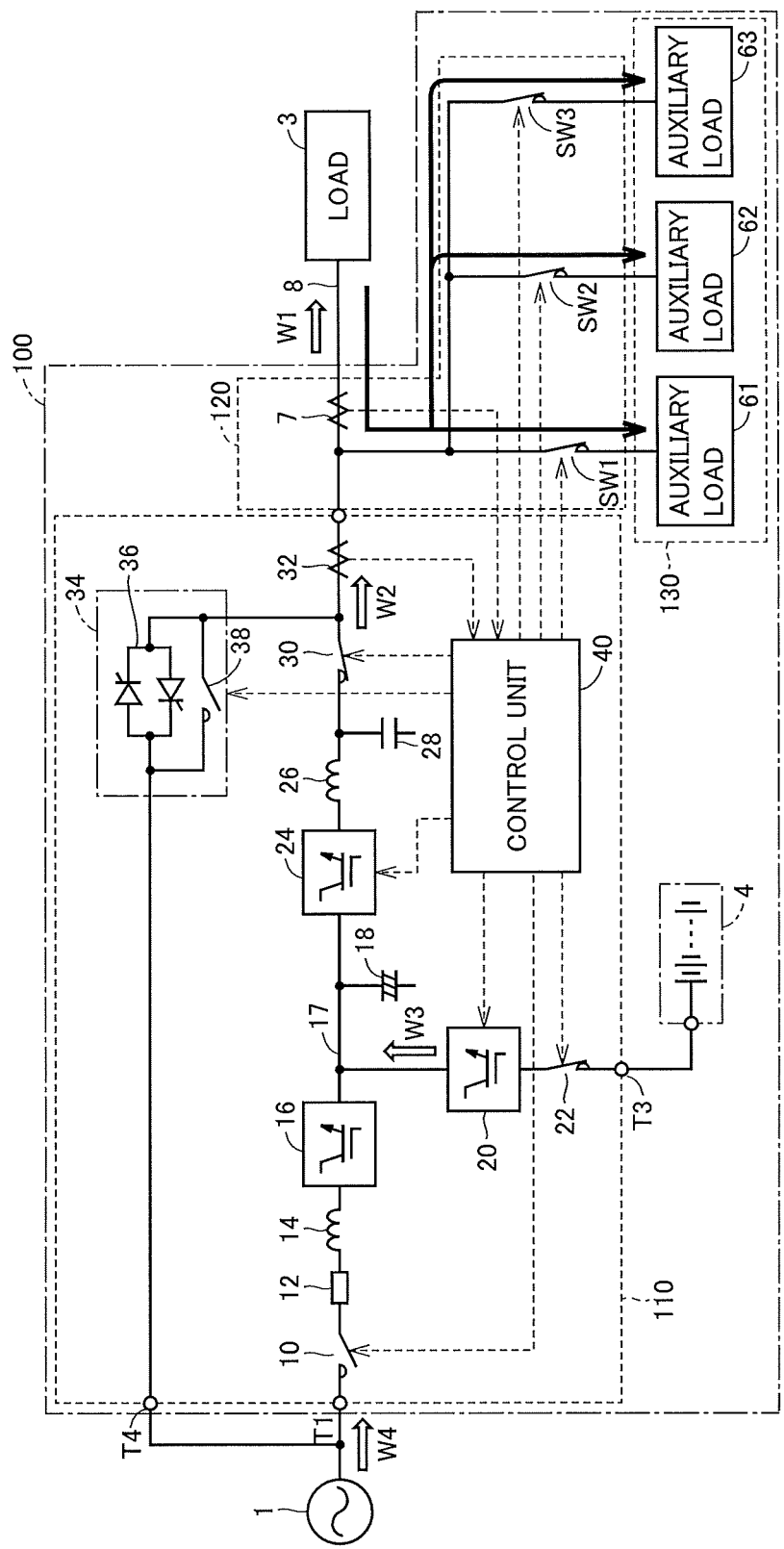
FIG. 10 is a diagram showing a flow of regenerative power in a case where the commercial power supply cannot recover the regenerative power.

(2) In a Case where Commercial Power Supply 1 Cannot Recover the Regenerative Power When the AC power from commercial power supply 1 becomes abnormal, it is not possible to return the regenerative power generated in load 3 to commercial power supply 1. FIG. 10 is a diagram showing a flow of regenerative power in a case where commercial power supply 1 cannot recover the regenerative power. In FIG. 10, the flow of the regenerative power is indicated by arrows.

As shown in FIG. 10, when control unit 40 determines that load 3 is performing the regenerative operation, control unit 40 turns on switches SW1 to SW3 of switch unit 120. Control unit 40 equalizes the regenerative power generated in load 3 with the power consumption in entire auxiliary load unit 130, by controlling turning on/off of switches SW1 to SW3 based on the magnitude of the regenerative power. Since control of turning on/off of switches SW1 to SW3 by control unit 40 is the same as that illustrated in FIG. 5, the detailed description thereof will not be repeated.

Also in the third embodiment, the regenerative power is not supplied to output terminal T2 of uninterruptible power supply unit 110, but is supplied to auxiliary load unit 130. Control unit 40 causes auxiliary load unit 130 to consume the regenerative power. In this case, operation of inverter 24 and converter 16 is stopped.

When load 3 switches from the regenerative operation to the power running operation, control unit 40 turns off switches SW1 to SW3 to electrically disconnect auxiliary loads 61 to 63 from AC bus 8. Alternatively, during the regenerative operation of load 3, when the AC power from commercial power supply 1 is restored to a normal state, that is, when commercial power supply 1 is restored to a state where it can recover the regenerative power, control unit 40 turns off switches SW1 to SW3 to electrically disconnect auxiliary loads 61 to 63 from AC bus 8.

As described above, according to the uninterruptible power supply device in accordance with the third embodiment of the present invention, the same effect as that of the uninterruptible power supply device in accordance with the second embodiment can be obtained. It should be noted that, in the third embodiment, in the case where commercial power supply 1 can recover the AC power, the regenerative power can be efficiently recovered by returning the regenerative power to commercial power supply 1 via bypass circuit 34.

Fourth Embodiment

Figure 11:
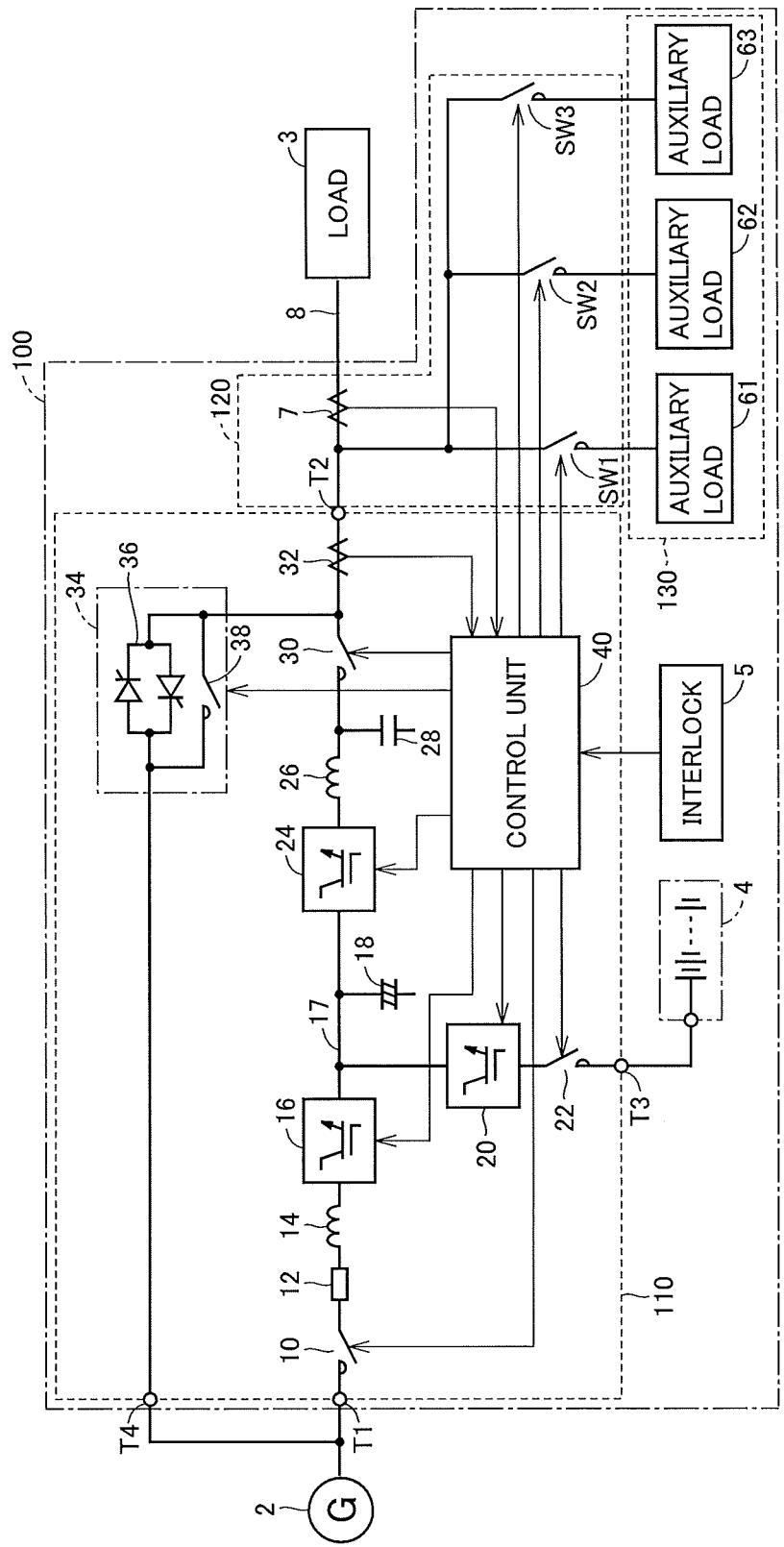
FIG. 11 is a circuit block diagram showing a configuration of an uninterruptible power supply device in accordance with a fourth embodiment of the present invention.

FIG. 11 is a circuit block diagram showing a configuration of uninterruptible power supply device 100 in accordance with a fourth embodiment of the present invention, which is compared with FIG. 10. Referring to FIG. 11, this uninterruptible power supply device 100 is different from uninterruptible power supply device 100 in FIG. 10 in that interlock unit 5 is included. In FIG. 10, an AC power supply is power generator 2.

Interlock unit 5 is configured such that, when the AC power supply is power generator 2, interlock unit 5 prohibits regenerative power generated in load 3 from being returned to power generator 2. This can prevent power generator 2 from being broken by receiving the regenerative power. In the third embodiment, since the AC power supply is set as power generator 2, interlock unit 5 outputs, to control unit 40, a control command for prohibiting returning the regenerative power to the AC power supply.

Next, operation of uninterruptible power supply device 100 in accordance with the fourth embodiment will be described. Since operation in a case where load 3 is performing power running operation is the same as that in uninterruptible power supply device 100 in FIG. 10, a description will be given on operation in a case where load 3 is performing regenerative operation.

In the third embodiment, returning the regenerative power to power generator 2, which is the AC power supply, is prohibited by interlock unit 5. Therefore, when control unit 40 determines that load 3 is performing the regenerative operation, control unit 40 turns on switches SW1 to SW3 of switch unit 120. In this case, control unit 40 can equalize the regenerative power generated in load 3 with the power consumption in entire auxiliary load unit 130, by controlling turning on/off of switches SW1 to SW3 based on the magnitude of the regenerative power. Since control of turning on/off of switches SW1 to SW3 by control unit 40 is the same as that illustrated in FIG. 5, the detailed description thereof will not be repeated.

Figure 12:
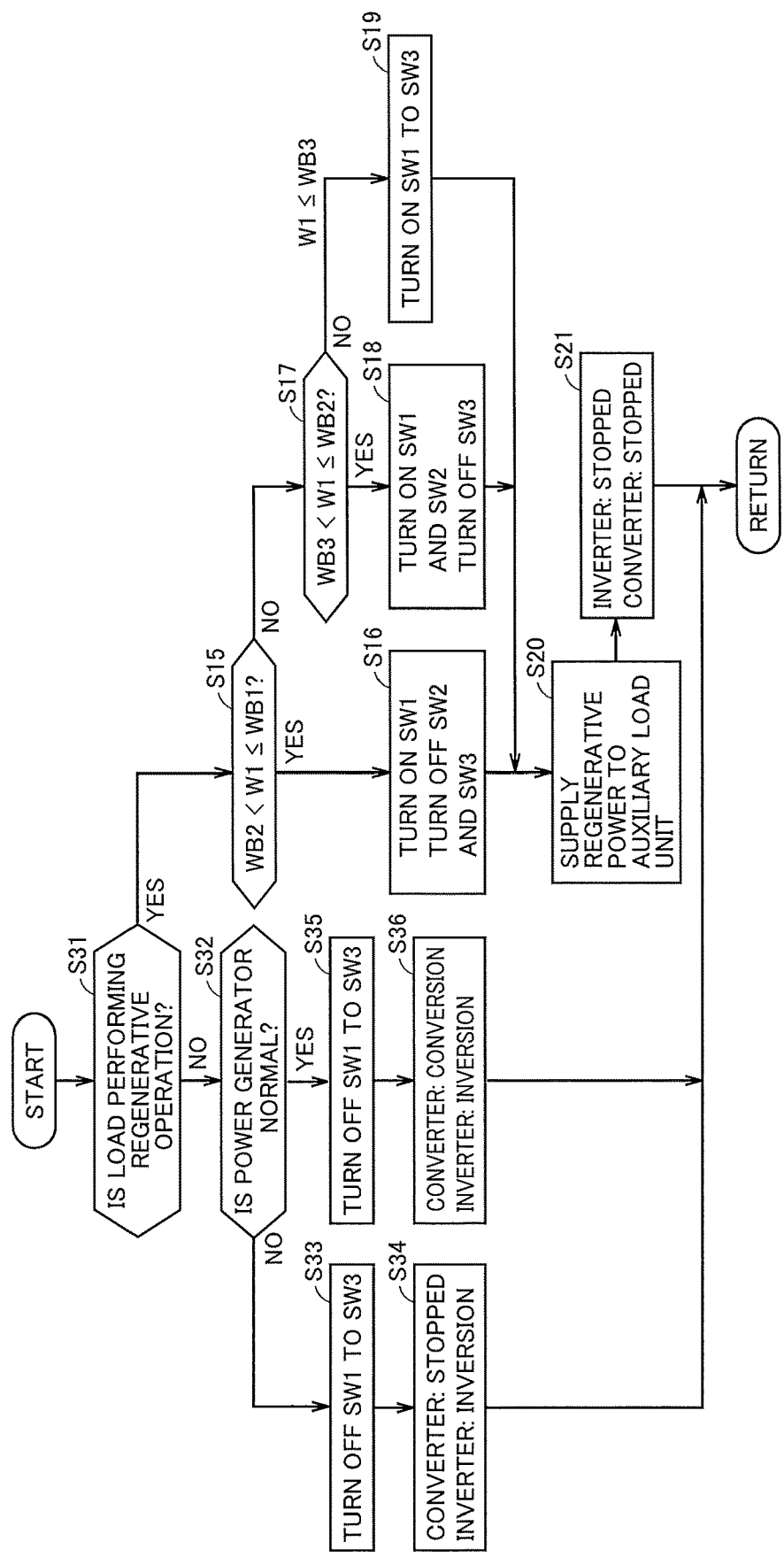
FIG. 12 is a flowchart for illustrating control performed by a control unit shown in FIG. 11.

FIG. 12 is a flowchart for illustrating control performed by control unit 40 shown in FIG. 11. Processing in this flowchart is invoked from a main routine and performed at regular time intervals or whenever predetermined conditions are satisfied.

Referring to FIG. 12, in step S31, control unit 40 determines whether or not load 3 is performing regenerative operation, based on an output signal of current detector 7. When load 3 is not performing regenerative operation, i.e., when load 3 is performing power running operation (NO in S31), control unit 40 proceeds to step S32, and determines whether or not AC power from power generator 2 is normal.

When the AC power from power generator 2 is normal (YES in S32), in step S35, control unit 40 turns off switches SW1 to SW3 of switch unit 120. In step S36, converter 16 converts the AC power from commercial power supply 1 into DC power. The DC power generated by converter 16 is stored in battery 4 via bidirectional chopper 20 and switch 22. Inverter 24 converts the DC power generated by converter 16 into AC power. Control unit 40 controls conversion in converter 16 and inversion in inverter 24. Thereby, load 3 receives the AC power supplied from commercial power supply 1 and performs the power running operation.

When the AC power from power generator 2 becomes abnormal (NO in S32), in step S33, control unit 40 turns off switches SW1 to SW3 of switch unit 120. In step S34, inverter 24 converts the DC power stored in battery 4 into AC power. On this occasion, operation of converter 16 is stopped. Control unit 40 controls inversion in inverter 24. Thereby, load 3 receives power supply from battery 4 and performs the power running operation.

In contrast, when load 3 is performing the regenerative operation (YES in S31), control unit 40 controls turning on/off of switches SW1 to SW3 of switch unit 120 based on load power W1 (regenerative power), by performing processing shown in steps S15 to S21 which is identical to that in FIG. 7.

As described above, according to the uninterruptible power supply device in accordance with the fourth embodiment of the present invention, the same effect as that of the uninterruptible power supply device in accordance with the second embodiment can be obtained. It should be noted that, in the fourth embodiment, in the case where the uninterruptible power supply device is connected to private power generator 2 instead of commercial power supply 1, the regenerative power generated in load 3 can be suppressed from being returned to private power generator 2. Therefore, private power generator 2 can be prevented from being broken.

It should be understood that the embodiments disclosed herein are illustrative, and the embodiments are not limited to the contents described above. The scope of the present invention is defined by the scope of the claims, and is intended to include any modifications within the scope and meaning equivalent to the scope of the claims.

REFERENCE SIGNS LIST

1: commercial power supply; 2: private power generator; 3: load; 4: battery; 5: interlock unit; 7, 32: current detector; 8: AC bus; 10, 22, 30, 38, SW, SW1 to SW3: switch; 12: fuse; 14, 26: reactor; 16: converter; 18: electrolytic capacitor; 20: bidirectional chopper; 24: inverter; 28: capacitor; 34: bypass circuit; 36: semiconductor switch; 40: control unit; 6, 61 to 63: auxiliary load; 100: uninterruptible power supply device; 110: uninterruptible power supply unit; 120: switch unit; 130: auxiliary load unit; T1: input terminal; T2: output terminal; T3: battery terminal; T4: bypass terminal.

The invention claimed is:

1. An uninterruptible power supply device configured to supply AC power supplied from an AC power supply to a load which alternately performs power running operation and regenerative operation, the uninterruptible power supply device comprising:
   an uninterruptible power supply unit connected between the AC power supply and the load;
   an auxiliary load unit connected to an AC bus which connects the uninterruptible power supply unit and the load, and configured to consume regenerative power generated in the load;
   a switch unit connected between the AC bus and the auxiliary load unit; and
   a control unit configured to control the uninterruptible power supply unit and the switch unit,
   during the power running operation of the load, the control unit being configured to turn off the switch unit to supply the AC power from the uninterruptible power supply unit to the load,
   during the regenerative operation of the load,
      in a first case where the AC power supply can recover the regenerative power, the control unit being configured to turn off the switch unit to supply the regenerative power to the AC power supply via the uninterruptible power supply unit, and
      in a second case where the AC power supply cannot recover the regenerative power, the control unit being configured to turn on the switch unit to supply the regenerative power to the auxiliary load unit.

2. The uninterruptible power supply device according to claim 1, wherein
   the first case is a case where the AC power supply is a commercial power supply and AC power is normally supplied from the commercial power supply, and
   the second case is a case where the AC power supply is a commercial power supply and AC power is not normally supplied from the commercial power supply, or a case where the AC power supply is a power generator.

3. The uninterruptible power supply device according to claim 2, wherein
   the AC power supply is the power generator, and
   the control unit is configured to turn off the switch unit when the load is performing the power running operation, and is configured to turn on the switch unit when the load is performing the regenerative operation.

4. The uninterruptible power supply device according to claim 1, further comprising a current detector configured to detect a current flowing to the AC bus, wherein
   the control unit is configured to obtain an active current and a reactive current from a detection value of the current detector, determine that the load is performing the power running operation when the active current is flowing into the load, and determine that the load is performing the regenerative operation when the active current is flowing out of the load.

5. The uninterruptible power supply device according to claim 4, wherein
   the auxiliary load unit includes a plurality of auxiliary loads connected in parallel with each other with respect to the AC bus,
   the switch unit includes a plurality of switches each connected between corresponding one of the plurality of auxiliary loads and the AC bus, and
   during the regenerative operation of the load, the control unit is configured to sequentially turn on the plurality of switches while a magnitude of the regenerative power is increasing, and sequentially turn off the plurality of switches while the magnitude of the regenerative power is decreasing.

6. The uninterruptible power supply device according to claim 5, wherein, during the regenerative operation of the load, the control unit is configured to increase a number of switches to be turned on, of the plurality of switches, when the magnitude of the regenerative power is more than a predetermined threshold value, as compared with when the magnitude of the regenerative power is less than the predetermined threshold value.

7. The uninterruptible power supply device according to claim 1, wherein
   the uninterruptible power supply unit includes
      a converter configured to convert the AC power from the AC power supply into DC power,
      an inverter configured to convert the DC power generated by the converter or DC power in a power storage device into AC power, and
      a bypass circuit connected between the AC power supply and the load, and
   during the regenerative operation of the load, in the first case, the control unit is configured to turn off the switch unit and turn on the bypass circuit to supply the regenerative power to the bypass power supply via the bypass circuit.

* * * * *